United States Patent
Jaradi et al.

(10) Patent No.: US 11,077,817 B1
(45) Date of Patent: Aug. 3, 2021

(54) AIRBAG ASSEMBLY INFLATABLE FROM SEAT BOTTOM

(71) Applicant: Ford Global Technologies, LLC, Dearborn, MI (US)

(72) Inventors: Dean M. Jaradi, Macomb, MI (US); S. M. Iskander Farooq, Novi, MI (US); Mohammad Omar Faruque, Ann Arbor, MI (US); Anil Kalra, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 16 days.

(21) Appl. No.: 16/750,024

(22) Filed: Jan. 23, 2020

(51) Int. Cl.
*B60R 21/207* (2006.01)
*B60R 21/2338* (2011.01)
*B60R 21/013* (2006.01)

(52) U.S. Cl.
CPC ........ *B60R 21/207* (2013.01); *B60R 21/2338* (2013.01); *B60R 21/013* (2013.01); *B60R 2021/23386* (2013.01)

(58) Field of Classification Search
CPC .............. B60R 21/207; B60R 21/2338; B60R 2021/23386; B60R 21/013
See application file for complete search history.

(56) References Cited

U.S. PATENT DOCUMENTS

| | | | |
|---|---|---|---|
| 5,082,326 A | 1/1992 | Sekido et al. | |
| 6,029,993 A * | 2/2000 | Mueller | B60R 21/23138 280/730.2 |
| 6,217,062 B1 * | 4/2001 | Breyvogel | B60N 2/68 280/728.2 |
| 6,296,292 B1 | 10/2001 | Feldman | |
| 6,648,409 B1 | 11/2003 | Laporte | |
| 6,935,684 B2 | 8/2005 | Sakai | |
| 7,328,945 B2 | 2/2008 | Yoshikawa | |
| 7,758,121 B2 | 7/2010 | Browne et al. | |
| 9,199,559 B2 * | 12/2015 | Wilmot | B60N 2/4242 |
| 10,023,146 B2 | 7/2018 | Faruque et al. | |
| 2004/0178616 A1 | 9/2004 | Yoshikawa | |
| 2005/0184491 A1 * | 8/2005 | Itoga | B60R 22/1951 280/730.1 |
| 2006/0119149 A1 | 6/2006 | Yoshikawa et al. | |
| 2007/0235990 A1 * | 10/2007 | Yoshikawa | B60R 21/207 280/730.1 |
| 2014/0167465 A1 | 6/2014 | Sakata et al. | |
| 2018/0126941 A1 * | 5/2018 | Faruque | B60R 21/261 |
| 2019/0023213 A1 * | 1/2019 | Faruque | B60R 21/207 |
| 2019/0054884 A1 * | 2/2019 | Dry | B60R 21/2338 |
| 2019/0071046 A1 * | 3/2019 | Dry | B60R 21/207 |
| 2020/0231067 A1 * | 7/2020 | Roman | B60N 2/3011 |

FOREIGN PATENT DOCUMENTS

EP 0879155 B1 9/2003

\* cited by examiner

*Primary Examiner* — Drew J Brown
(74) *Attorney, Agent, or Firm* — Frank A. MacKenzie; Bejin Bieneman PLC

(57) ABSTRACT

An assembly includes a seatback and a seat bottom. The seat bottom has a seat bottom frame. The seat bottom frame has a front side spaced from the seatback, a first side extending between the seatback and the front side, and a second side spaced from the first side and extending between the seatback and the front side. An airbag is supported by the front side and inflatable to an inflated position. An external tether extends from the airbag to the seatback.

20 Claims, 9 Drawing Sheets

AIRBAG ASSEMBLY INFLATABLE FROM SEAT BOTTOM

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

Figure 1:
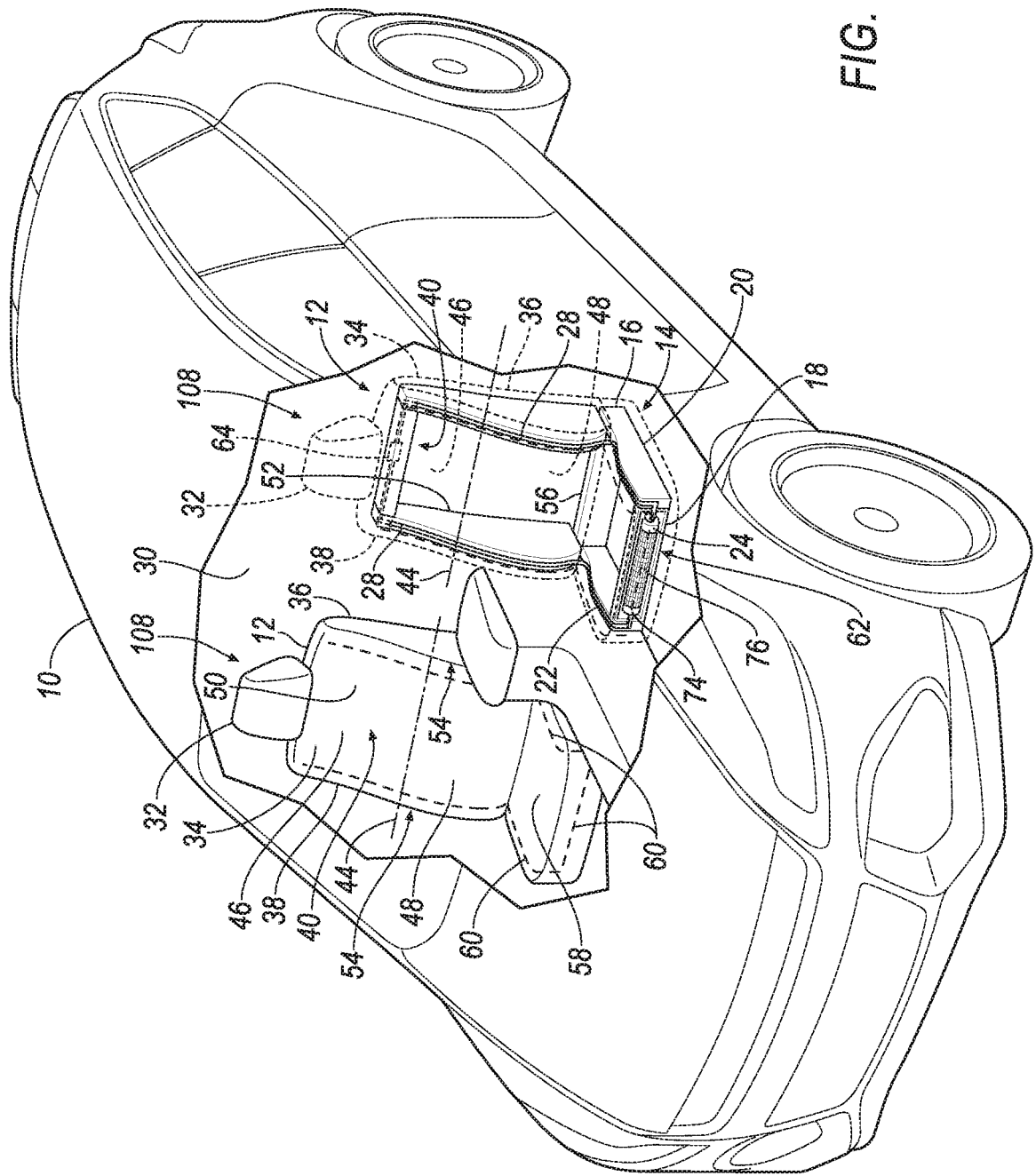
FIG. 1 is a perspective view of a vehicle including a seat with an airbag.

An assembly includes a seatback and a seat bottom. The seat bottom has a seat bottom frame. The seat bottom frame has a front side spaced from the seatback, a first side extending between the seatback and the front side, and a second side spaced from the first side and extending between the seatback and the front side. An airbag is supported by the front side and inflatable to an inflated position. An external tether extends from the airbag to the seatback.

The airbag may include an inflatable portion and a non-inflatable portion.

The inflatable portion may be elongated from a first end to a second end. The first end and the second end may be spaced from each other and connected to the seat bottom. The inflatable portion may be spaced from the seat bottom between the first end and the second end in the inflated position.

The non-inflatable portion may be connected to the inflatable portion between the first end and the second end.

The non-inflatable portion may be adjacent the seat bottom in the inflated position.

The non-inflatable portion may be connected to the inflatable portion at a first location adjacent the first end and at a second location adjacent the second end.

The non-inflatable portion may be connected to the inflatable portion between the first location and the second location.

The inflatable portion may turn generally 180 degrees from the first end to the second end.

The inflatable portion may be tubular from the first end to the second end.

The inflatable portion may have a first leg at the first end, a second leg at the second end, and a cross-member spaced from the seat bottom and extending from the first leg to the second leg, the non-inflatable portion being connected to the first leg, the second leg, and the cross-member.

The external tether may be embedded in the seatback and the seat bottom before the airbag is in the inflated position.

The external tether may be connected to an upper portion of the seatback.

The airbag may have a distal end distal to the seat bottom in the inflated position and the external tether may be connected to the distal end.

The assembly may include a second external tether spaced from the external tether and extending from the airbag to the seatback.

The seatback may have a first bolster, a second bolster, and an occupant seating area between the first bolster and the second bolster, the external tether may be connected to the first bolster and the second external tether may be connected to the second bolster.

The airbag may have a distal end distal to the seat bottom in the inflated position. The external tether and the second external tether may be connected to the distal end.

The external tether may be embedded in the first bolster and the seat bottom before the airbag is inflated to the inflated position and the second external tether may be embedded in the second bolster and the seat bottom before the airbag is inflated to the inflated position.

The seatback may include an actuator. The external tether may be connected to the actuator and retractable by the actuator.

With reference to the Figures, wherein like numerals indicate like parts throughout the several views, an assembly for a vehicle 10 is generally shown. The assembly includes a seatback 12 and a seat bottom 14. The seat bottom 14 has a seat bottom frame 16. The seat bottom frame 16 has a front side 18 spaced from the seatback 12, a first side 20 extending between the seatback 12 and the front side 18, and a second side 22 spaced from the first side 20 and extending between the seatback 12 and the front side 18. An airbag 24 is supported by the front side 18 and is inflatable to an inflated position 26. An external tether 28 extends from the airbag 24 to the seatback 12.

Figure 2:
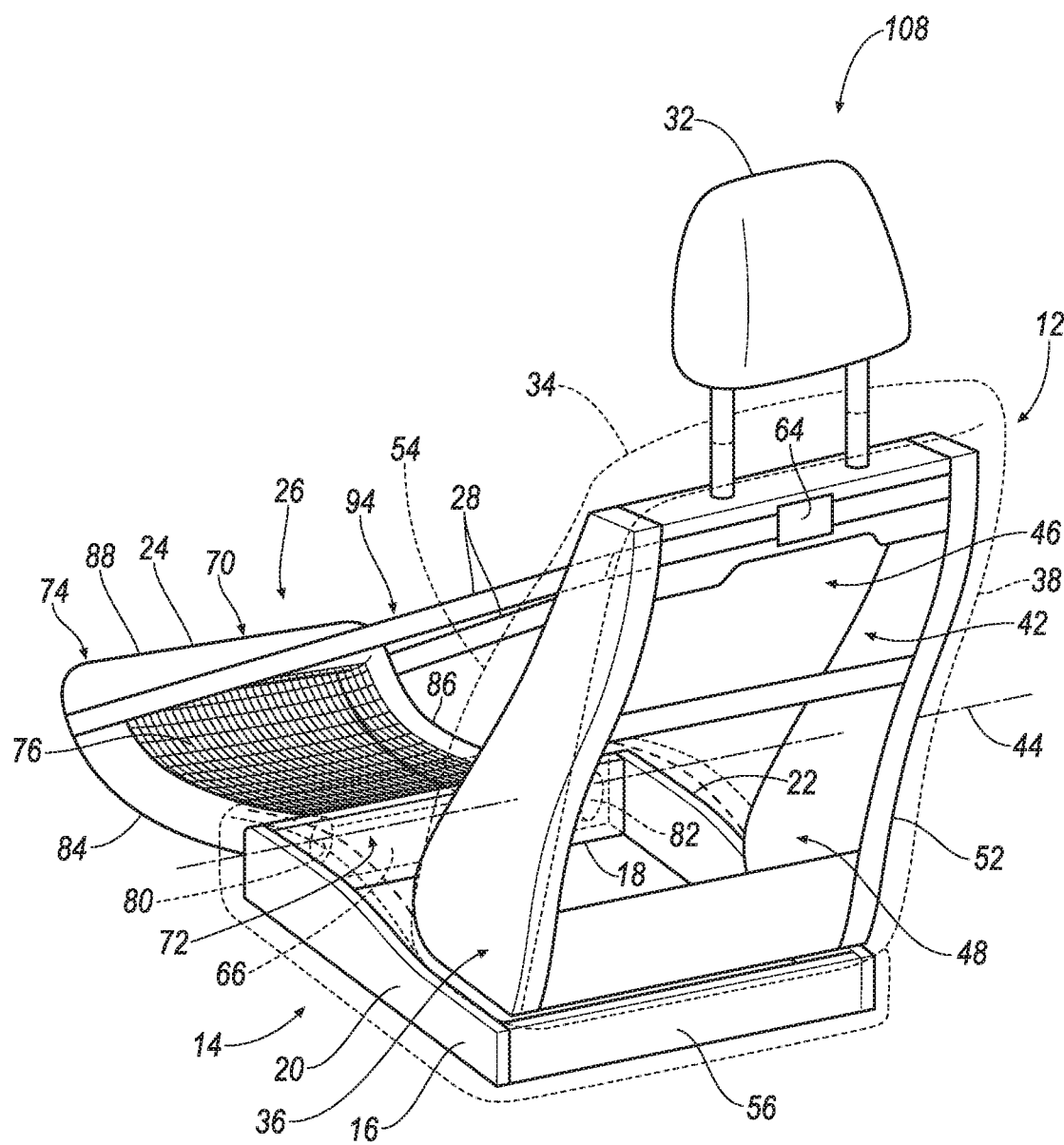
FIG. 2 is a perspective view of the seat including the airbag in an inflated position.

The airbag 24 is inflatable to the inflated position 26, shown in FIG. 2, to control the kinematics of the vehicle occupant. When the occupant is urged in a direction away from the seatback 12 and beyond the front side 18 of the seat bottom frame 16, the occupant contacts the airbag 24. The external tether 28 supports the airbag 24. Specifically, the airbag 24 and the occupant are supported by the external tether 28. In other words, when the occupant is urged in a direction away from the seatback 12 and beyond the front side 18 of the seat bottom frame 16, the airbag 24 and the external tether 28 in the inflated position 26 support the occupant.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, for example may be an autonomous vehicle. In other words, the vehicle 10 may be autonomously controlled such that the vehicle 10 may be driven without constant attention from the driver.

The vehicle 10 includes a passenger cabin 30 to house occupants, if any, of the vehicle 10. The vehicle 10 includes one or more seats 108. The seats 108 may be arranged in the passenger cabin 30 in any suitable position, i.e., as front seats, rear seats, third-row seats, etc. The seats 108 may be moveable relative to the floor to various positions, e.g., movable fore-and-aft and/or cross vehicle. The seats 108 may be of any suitable type, e.g., a bucket seat as shown in FIGS. 1 and 2.

The seat 108 may include the seatback 12, the seat bottom 14, and a head restraint 32. The seat includes a covering 34, as described further below. The seatback 12 may be supported by the seat bottom 14 and may be stationary or moveable relative to the seat bottom 14. The head restraint 32 may be supported by the seatback 12 and may be stationary or movable relative to the seatback 12. The seatback 12, the seat bottom 14, and the head restraint 32 may be adjustable in multiple degrees of freedom. Specifically, the seatback 12, the seat bottom 14, and the head restraint 32 may themselves be adjustable, in other words, adjustable components within the seatback 12, the seat bottom 14, and/or the head restraint 32 may be adjustable relative to each other.

The seatback 12 includes a first side 36, a second side 38, a front 40 extending between the first side 36 and the second side 38, and a rear 42 extending between the first side 36 to the second side 38. As shown in FIG. 2, when the seat 108 is in the forward-facing position, the front 40 of the seat faces vehicle-forward and the rear 42 of the seat 108 faces vehicle-rearward.

The seatback 12 includes a midline 44 extending from the first side 36 to the second side 38. Specifically, the midline 44 is horizontal. The seatback 12 includes an upper portion 46 above the midline 44 and a lower portion 48 below the midline 44.

The seatback 12 defines an occupant seating area 50 on the front 40 between the first side 36 and the second side 38. When the occupant occupies the seat, the back of the occupant leans against the occupant seating area 50.

The seatback 12 may include a seatback frame 52. The seatback frame 52 may include tubes, beams, etc. The seatback frame 52 may be of any suitable plastic material, e.g., carbon fiber reinforced plastic (CFRP), glass fiber reinforced semi-finished thermoplastic composite (organosheet), etc. As another example, some or all components of the seatback frame 52 may be a suitable metal, e.g., a steel, aluminum, etc.

The seatback 12 may have bolsters 54 on opposite sides of the occupant seating area 50. The bolsters 54 are elongated, and specifically, are elongated in a generally upright direction when the seatback 12 is in a generally upright position. The bolsters 54 define cross-seat boundaries of the seatback 12, i.e., the seatback 12 terminates at the bolsters 54. The bolsters 54 may extend in a seat-forward direction relative to the occupant seating area 50, i.e., on opposite sides of the torso and shoulders of an occupant seated on the seat assembly. The extension of the bolsters 54 relative to the occupant seating area 50 may be defined by the seatback frame 52 and/or the covering 34. In the example shown in the Figures, the size and shape of both the seatback frame 52 and the covering 34 form the bolsters 54.

The seat bottom 14 may include the seat bottom frame 16. The seat bottom frame 16 includes the front side 18, a rear side 56, the first side 20, and the second side 22. The rear side 56 is proximate the seatback 12 and the front side 18 is distal the seatback 12. When the seat 108 is in the forward-facing position, the front side 18 of the seat bottom frame 16 faces vehicle-forward. The first side 20 and the second side 22 are spaced from each other, i.e., in a cross-seat direction. As set forth above, the first side 20 and the second side 22 both extend between the seatback 12 and the front side 18. In other words, the first side 20 and the second side 22 are elongated in a seat-forward direction. As an example, the first side 20 and the second side 22 may extend from the seatback 12 to the front side 18. In such examples, the first side 20 and the second side 22 may be connected to the seatback 12, e.g., by a rotatable hinge.

The seat bottom frame 16 may include tubes, beams, etc. The seat bottom frame 16 may be of any suitable plastic material, e.g., carbon fiber reinforced plastic (CFRP), glass fiber reinforced semi-finished thermoplastic composite (organosheet), etc. As another example, some or all components of the seat bottom frame 16 may be of a suitable material, e.g., a steel, aluminum, etc.

The seat bottom 14, e.g., the covering 34, may include a top side 58 extending between the first side 20 and the second side 22. The top side 58 of the covering 34 faces the vehicle roof. When the occupant occupies the seat, the occupant rests on the top side 58 of the seat bottom 14.

As set forth above, the seat 108 includes one or more covering 34. Specifically, the seat bottom 14 and/or the seatback 12 may each include the covering 34. For example, seat bottom 14 may include the covering 34 supported on the seat bottom frame 16 and the seatback 12 may include the covering 34 supported on the seat bottom frame 16. The covering 34 on the seat bottom frame 16 may be separate from the covering 34 on the seatback frame 52. The covering 34 may include upholstery and padding. The upholstery may be cloth, faux leather, or any other suitable material. The upholstery may be stitched in panels around the frame. The padding may be between the covering 34 and the seatback frame 52 and may be foam or any other suitable material. The covering 34, e.g., the covering 34 on the seat bottom frame 16, may include a tear seam 60 adjacent to the airbag 24. The airbag 24 tears and extends through the tear seam 60 in the inflated position 26.

The vehicle includes an airbag assembly 62. The airbag assembly 62 includes the airbag 24 and the external tether 28. The seatback 12 may include an actuator 64 connected to the external tether 28 to retract the external tether 28, as described further below. As described above, the airbag 24 is inflated in response to a vehicle impact and may support the occupant in the event the occupant moves forward on the seat bottom 14. The external tether 28 supports the airbag 24 to support the occupant on the airbag 24 in such an event. In examples including the actuator 64, the actuator 64 retracts the external tether 28 to provide support to the occupant and/or to move the occupant back toward the seat bottom 14.

The airbag 24 is supported by the seat bottom 14, e.g., the seat bottom frame 16. The airbag 24 may be supported by the front side 18 of the seat bottom frame 16. The airbag 24 may be directly or indirectly connected to the front side 18 of the seat bottom frame 16. As one example, the airbag 24 may be fastened to the front side 18 with releasable fasteners (not shown), e.g., tearable fabric straps. In such an example, the airbag 24 may be rolled in the uninflated position 26 and release the releasable fasteners as the airbag 24 unrolls to the inflated position 26. As another example, the airbag assembly 62 may include a housing 66 connected to the front side 18 and supporting the airbag 24. In examples including the housing 66, the airbag 24 may be folded in the housing 66 when the airbag 24 is uninflated and the airbag 24 extends from the housing 66 in the inflated position 26. The housing 66 may be, for example, plastic. The airbag assembly 62 may be concealed by the cover and may break through the tear seam 60 as the airbag 24 inflates to the inflated position 26.

The airbag assembly 62 includes an inflator 68. The inflator 68 is in fluid communication with the airbag 24 to inflate the airbag 24 with an inflation medium such as a gas.

Figure 4:
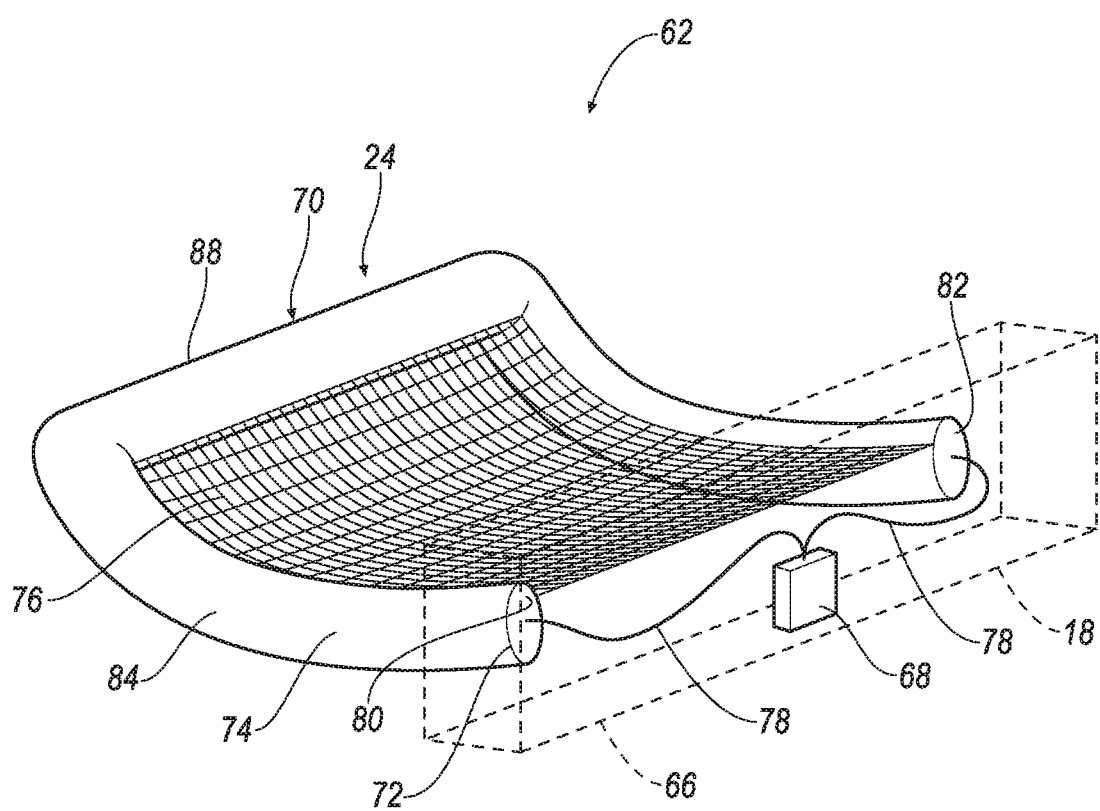
FIG. 4 is a perspective view of the airbag mounted to a front side of the seat and in the inflated position.
Figure 5:
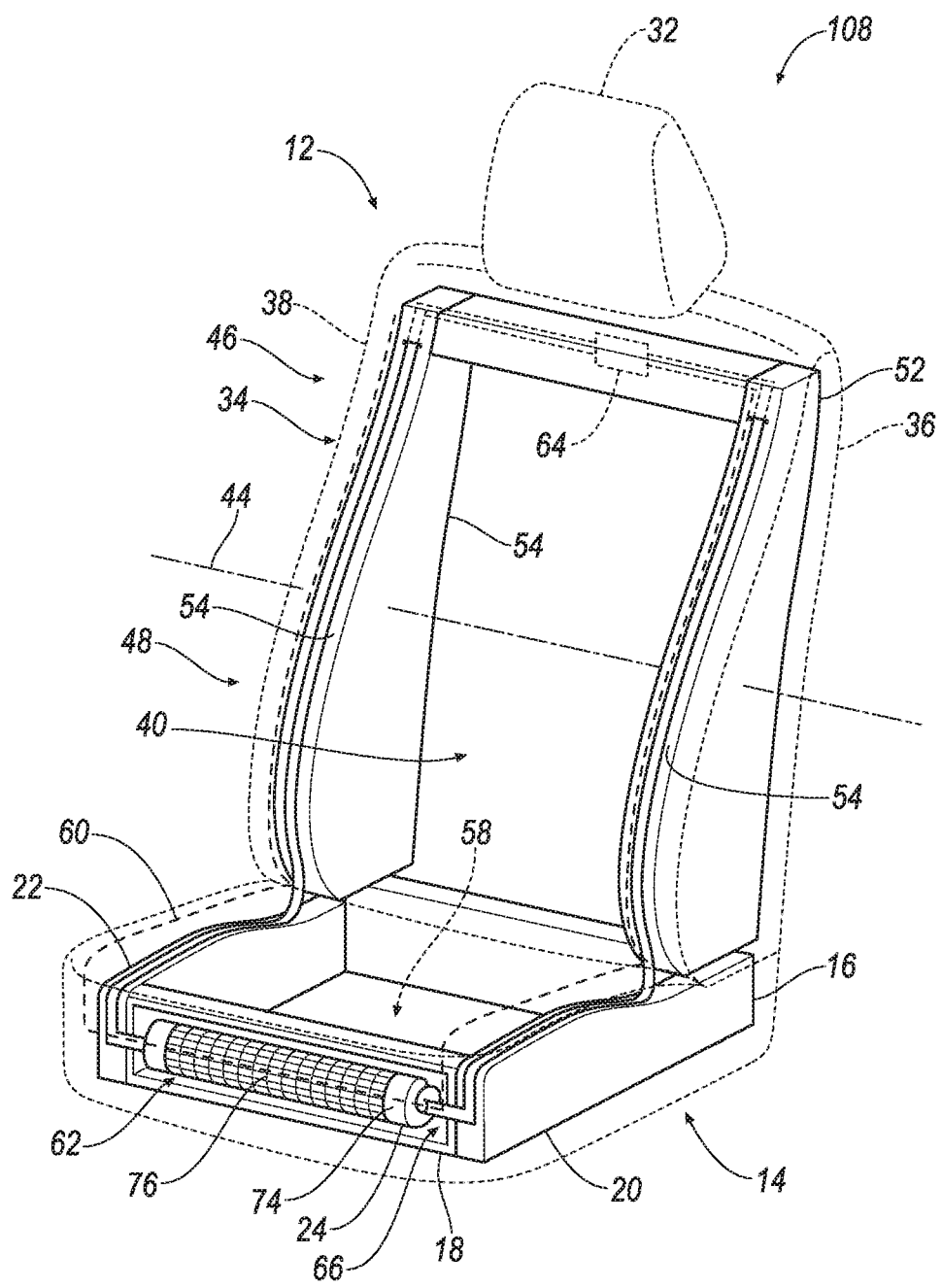
FIG. 5 is a perspective view of the seat with the airbag uninflated.

The inflator 68 may be, for example, a pyrotechnic inflator that uses a chemical reaction to drive inflation medium to the airbag 24. The inflator 68 may be of any suitable type, for example, a cold-gas inflator. With reference to FIG. 4, the inflator 68 may be fixed directly to the seat bottom frame 16. In such examples, the inflator may be mounted on the front side 18 of the seat bottom frame 16. As an example, the inflator 68 may be in fluid communication with the airbag 24 through one or more fill tubes 78 that extend through the front side 18. In examples including the housing 66, the inflator may be supported by the housing 66.

The airbag 24 has a distal end 70 and a proximal end 72. In the inflated position 26, the distal end 70 is distal to the seat bottom 14, e.g., the front side 18 of the seat bottom frame 16, and the proximal end 72 is proximate to the seat bottom 14, e.g., the front side 18 of the seat bottom frame 16. In other words, in the inflated position 26, the airbag 24 extends from the seat bottom 14 from the proximal end 72 to the distal end 70 and the proximal end 72 is between the seat bottom 14 and the distal end 70.

The airbag 24 may be elongated from the proximal end 72 to the distal end 70. In other words, the airbag 24 may be longer in the seat-forward direction than in the cross-seat direction.

As shown in FIGS. 2 and 4, the airbag 24 includes an inflatable portion 74 and may include a non-inflatable portion 76. The inflatable portion 74 includes an inflation chamber. The inflation chamber receives inflation medium from the inflator to inflate the airbag 24 to the inflated position 26. The non-inflatable portion 76 is not in fluid communication with the inflation chamber. In other words, the non-inflatable portion 76 is not inflated by the inflator 68 and does not inflate.

The inflatable portion 74 and the non-inflatable portion 76 may be formed separately and subsequently connected. In such examples, the non-inflatable portion 76 may be connected to the inflatable portion 74 by stitching. As another example, the inflatable portion 74 and the non-inflatable portion 76 may be unitary, i.e., the inflatable portion 74 and the non-inflatable portion 76 are a single, uniform piece of material with no seams, joints, fasteners, or adhesives holding them together. In this example, the inflatable portion 74 and the non-inflatable portion 76 may be woven as a unitary piece of fabric. The inflatable portion 74 and the non-inflatable portion 76 may be different material types or the same material type.

The inflatable portion 74 and the non-inflatable portion 76 may be fabric, as an example, the inflatable portion 74 may be woven nylon yarn, for example, nylon 6, 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane. The non-inflatable portion 76 may be the same type of material as the inflatable portion 74 or a different type of material than the inflatable portion 74.

The inflatable portion 74 may have a first end 80 and a second end 82 spaced from each other and each connected to the seat bottom 14, e.g., the front side 18 of the seat bottom frame 16. In such an example, the inflatable portion 74 may be elongated from the first end 80 to the second end 82. The first end 80 and the second end 82 may be connected to the seat bottom 14 on any suitable manner. For example, the first end 80 and the second end 82 may be connected directly or indirectly to the front side 18 of the seat bottom frame 16, as described above.

The inflatable portion 74 may be spaced from the seat bottom 14 between the first end 80 and the second end 82 in the inflated position 26. In such examples, the non-inflatable portion 76 may be between the inflatable portion 74 and the seat bottom 14. In other words, non-inflatable portion 76 may occupy a space between the inflatable portion 74 and the seat bottom 14, as described further below.

The inflatable portion 74 may be tubular from the first end 80 to the second end 82. In such an example, the inflation chamber may extend from the first end 80 to the second end 82. In examples in which the inflatable portion 74 is tubular, the cross-section of the inflatable portion 74 may be round (as shown in the Figures) or may be of any other suitable shape.

In examples in which the inflatable portion 74 is tubular, the inflatable portion 74 may turn generally 180 degrees from the first end 80 to the second end 82. For example, the inflatable portion 74 may extend from the front side 18 in generally the same direction at the first end 80 and the second end 82 and may turn generally 180 degrees between the first end 80 and the second end 82. As one example, the inflatable portion 74 may be generally U-shaped, as shown in the Figures. Specifically, the inflatable portion 74 may have a first leg 84 at the first end 80, a second leg 86 at the second end 82, and a cross-member 88 spaced from the seat bottom 14 and extending from the first leg 84 to the second leg 86. In such an example, the cross-member 88 is at the distal end 70 of the airbag 24. The inflation chamber may be continuous through the first leg 84, the cross-member 88, and the second leg 86, i.e., the inflator inflates each of the first leg 84, the cross-member 88, and the second leg 86. As another example, the inflatable portion 74 may be arcuate from the first end 80 to the second end 82.

As set forth above, the non-inflatable portion 76 may be between the inflatable portion 74 and the seat bottom 14. As set forth below, the non-inflatable portion 76 is supported by the inflatable portion 74 and moves with the inflatable portion 74 as the inflatable portion 74 inflates to the inflated position 26. The non-inflatable portion 76 may be adjacent the seat bottom 14 in the inflated position 26, i.e., the lack of any other elements between the non-inflatable portion 76 and the seat bottom 14.

As set forth above, the non-inflatable portion 76 is supported by the inflatable portion 74. For example, the non-inflatable portion 76 is connected to the inflatable portion 74. As set forth above, the non-inflatable portion 76 may be formed separately from the inflatable portion 74 and subsequently connected to the inflatable portion 74. As another example, the inflatable portion 74 and the non-inflatable portion 76 may be unitary.

In examples in which the inflatable portion 74 is tubular, the non-inflatable portion 76 is connected to the inflatable portion 74 between the first end 80 and the second end 82, i.e., the non-inflatable portion 76 is connected to the inflatable portion 74 at one or more locations between the first end 80 and the second end 82. The non-inflatable portion 76 may be connected to the inflatable portion 74 at a first location 90 adjacent the first end 80 and at a second location 92 adjacent the second end 82. In such an example, the non-inflatable portion 76 may be connected to the inflatable portion 74 between the first location 90 and the second location 92. Specifically, in examples in which the inflatable portion 74 is generally U-shaped, the non-inflatable portion 76 may be connected to the first leg 84, the second leg 86, and/or the cross-member 88. In the example shown in the Figures, the non-inflatable portion 76 is connected to the first leg 84, the second leg 86, and the cross-member 88.

The non-inflatable portion 76 may be connected to the seat bottom 14. For example, the non-inflatable portion 76 may be adhered, fastened, etc., to the front side 18 of the seat bottom frame 16.

The non-inflatable portion 76 may be webbing, as shown in the Figures. As other examples, the non-inflatable portion 76 may be roping, a solid panel, etc. As set forth above, the non-inflatable portion 76 may be fabric.

As set forth above, the airbag assembly 62 includes the external tether 28. The external tether 28 is external to the inflation chamber of the airbag 24. In the example shown in the Figures, the airbag assembly 62 includes two external tethers 28, i.e., a first external tether and a second external tether. The airbag assembly 62 may include any suitable number of external tethers 28, i.e., one or more. In the example shown in the Figures, the external tethers 28 are identical and common numerals are used to identify common features. In the example shown in the Figures, the external tethers 28 are spaced from each other, specifically in the cross-seat direction. The external tether 28 may be fabric, rope, wire, etc.

As set forth above, the external tethers 28 support the airbag 24 and the occupant in the event the occupant moves onto the airbag 24. The external tethers 28 extend from the seat 108 to the airbag 24. Specifically, the external tethers 28 extend from the seat back to the airbag 24. The external tethers 28 may extend from the bolsters 54, respectively, to the airbag 24. In the example shown in the Figures, the external tethers 28 extend from the upper portion 46 of the seatback 12 to the distal end 70 of the airbag 24 when the airbag 24 is in the inflated position 26.

The external tether 28 is connected to the airbag 24, e.g., to the distal end 70 of the airbag 24. Specifically, the external tether 28 may be stitched to the airbag 24.

The external tethers 28 are connected to the seatback 12. Specifically, the external tethers 28 are connected to the upper portion 46 of the seatback 12, e.g., at the bolsters 54. As set forth above and described further below, the seatback 12 may include the actuator 64 that retracts the external tether 28 and the actuator 64 is at the upper portion 46 of the seatback 12, e.g., at the bolsters 54.

In the uninflated position 26, the external tether 28 is embedded in the seatback 12, e.g., at the bolsters 54, and the seat bottom 14, e.g., outer regions of the seat bottom 14, before the airbag 24 is inflated to the inflated position 26. Specifically, the external tethers 28 may be in or below the cover of the seatback 12 and the seat bottom 14. When the airbag 24 is inflated, the airbag 24 pulls the external tether 28, which tears the cover as the external tethers 28 are pulled taught.

The seatback 12 includes the actuator 64. The external tether 28 is connected to the actuator 64 and is retractable by the actuator 64. In the example shown in the Figures, both external tethers 28 are connected to one actuator 64 and the actuator 64 simultaneously retracts both external tethers 28. As another example, the seatback 12 may include separate actuator 64s for each external tether 28.

The actuator 64 may be supported by the seatback frame 52. Specifically, the actuator 64 may be connected, i.e., directly or indirectly, to the seatback frame 52. In the example shown in the Figures, the actuator 64 is connected to the cross-member 88. In such an example, the external tethers 28 extend through the seatback frame 52, e.g., through slots in the seatback frame 52.

The actuator 64 may be any suitable type. As an example, the actuator 64 may be pyrotechnically activated. Specifically, the actuator 64 may be a pyrotechnic rotary retractor.

In such an example, the actuator 64 includes a spool that is rotated by activation of a pyrotechnic charge, in which case the external tethers 28 are wound around the spool to retract the external tethers 28.

Figure 3A:
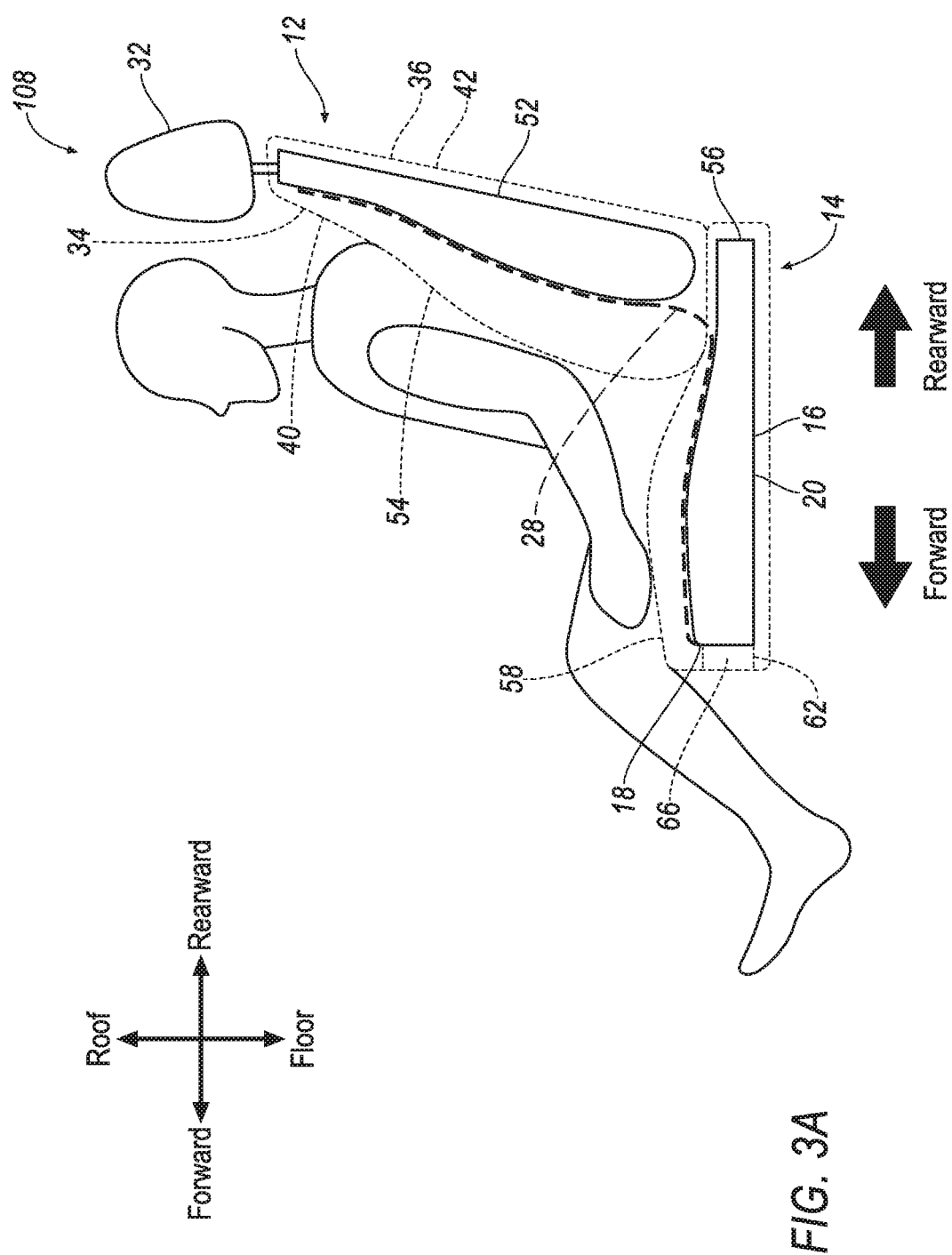
FIG. 3A is a side view of the seat with the airbag uninflated.
Figure 3B:
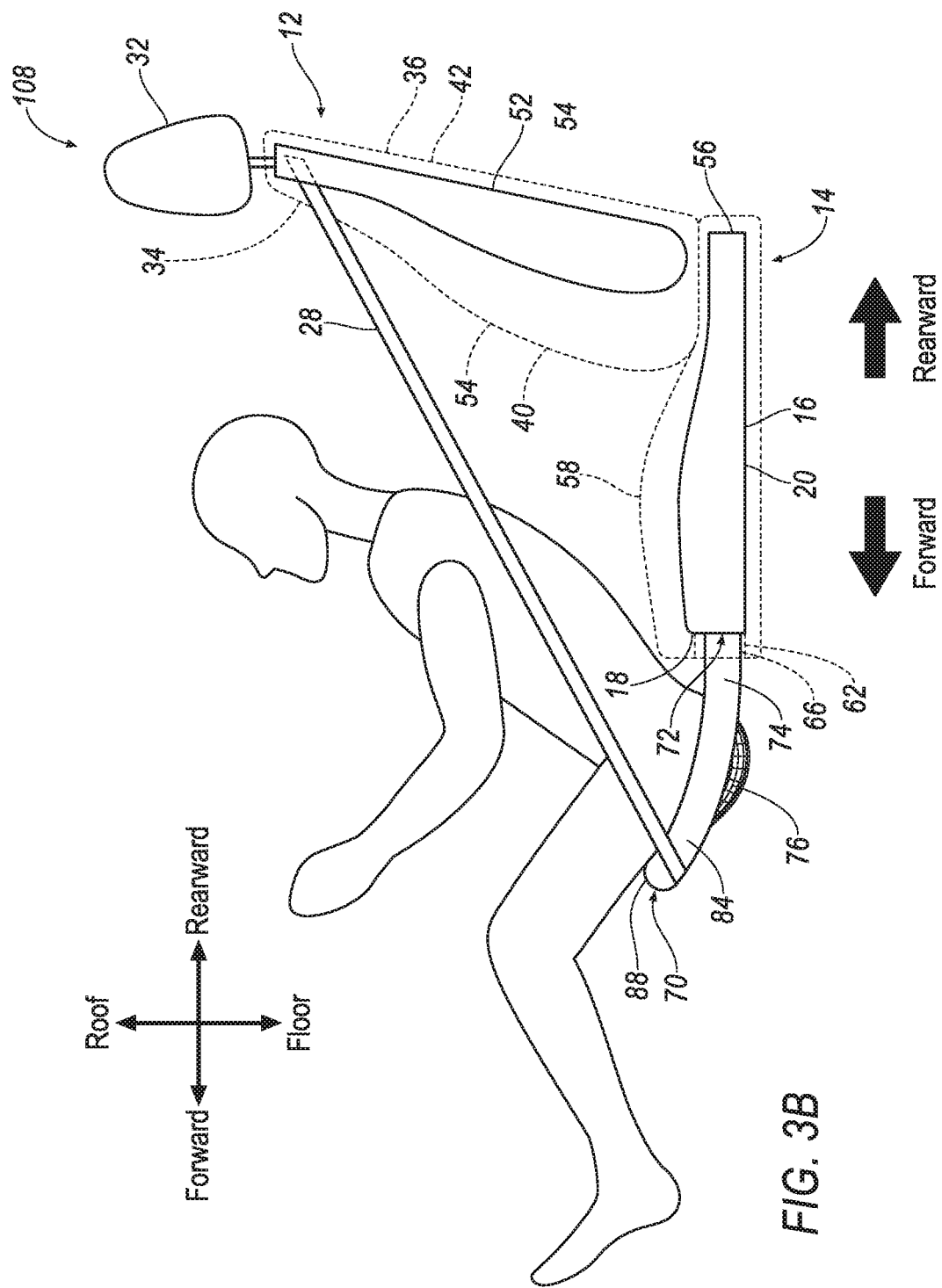
FIG. 3B is a side view of the seat with the airbag in the inflated position.
Figure 3C:
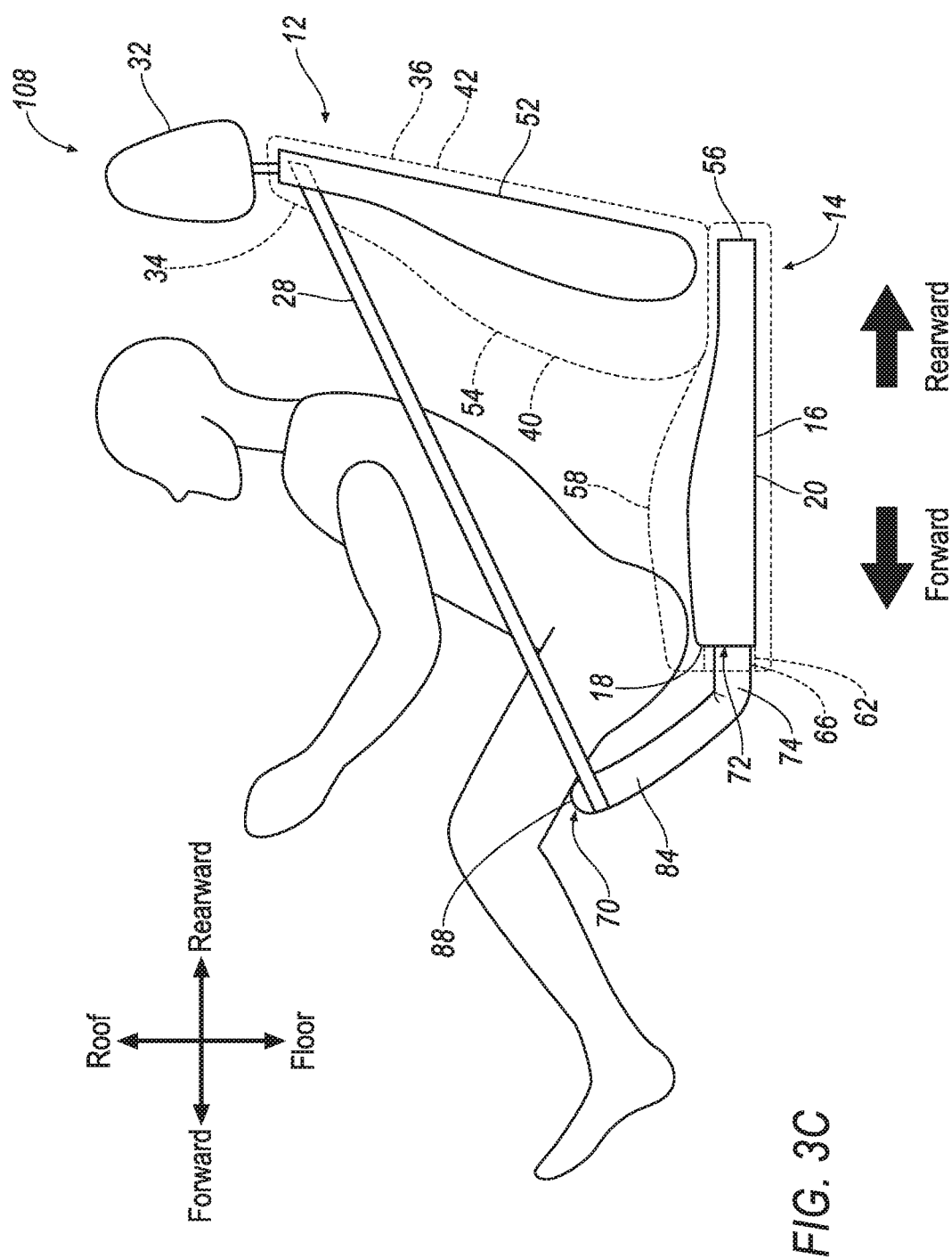
FIG. 3C is a side view of the seat with the airbag in the inflated position and an external tether retracted.

The external tether 28 is retractable by the actuator 64. Specifically, the external tether 28 may have a first length prior to activation of the actuator 64 and a second length after activation of the actuator 64. The second length is shorter than the first length, as shown in FIGS. 3B and 3C.

In the event of a vehicle impact that urges the occupant in the seat-forward direction, the airbag 24 is inflated to catch the occupant. As an example, the occupant may move in the seat-forward direction in the even the occupant is not buckled by a seat belt. The airbag 24 catches the occupant. Specifically, the inflatable portion 74 inflates in the seat-forward direction and pulls the non-inflatable portion 76 in the seat-forward direction. The inflatable portion 74 supports the non-inflatable portion 76 such that the occupant may be caught by the non-inflatable portion 76 and retained by the inflatable portion 74. In the example shown in the Figures, the actuator 64 retracts the external tether 28 to pull the occupant toward the seat.

The vehicle may include at least one impact sensor 102 in communication with the inflator and/or the actuator 64. The impact sensor 102 is designed to detect an impact to the vehicle. The inflator may be activated based on detected impact. The actuator 64 may be activated based on detected impact. The impact sensor 102 may be of any suitable type, for example, post-contact sensors such as accelerometers, pressure sensors, and contact switches; and pre-impact sensor 102s such as radar, LIDAR, and vision-sensing systems. The vision systems may include one or more cameras, CCD image sensors, CMOS image sensors, etc. The impact sensor 102 may be located at numerous points in or on the vehicle. The vehicle may include a computer 106 and a communications network 100. In the event of an impact, the impact sensor 102 may detect the impact and transmit a signal through the communications network 100 to the computer.

Figure 6:
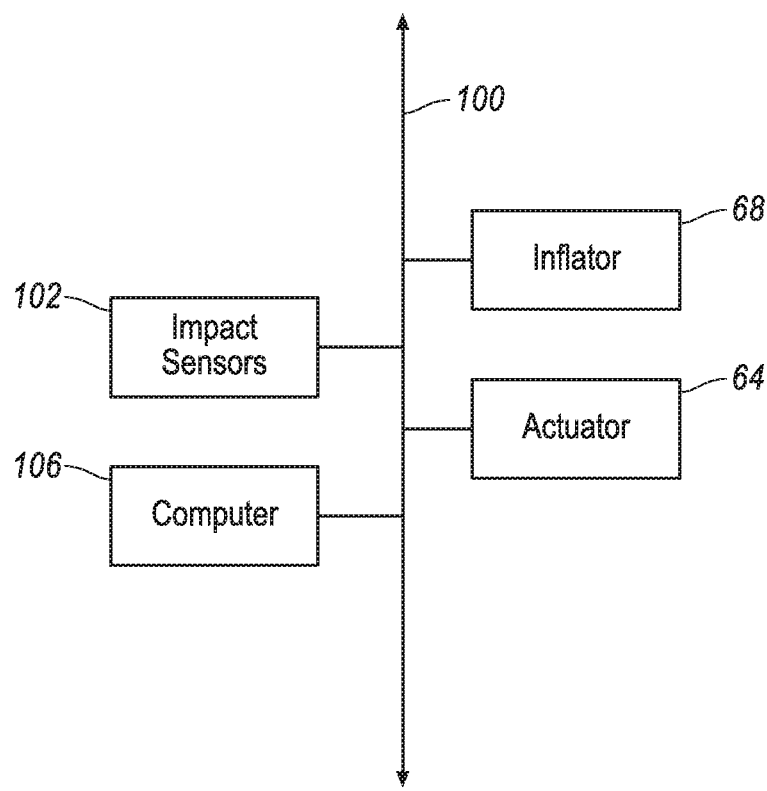
FIG. 6 is a block diagram of a communications network.

With reference to FIG. 6, the vehicle may include a control system 98 including the communications network 100 and the computer, e.g., an airbag control module. The communications network 100 may be a controller area network (CAN) bus, ethernet, wi-fi, local interconnect network (LIN), and/or by any other wired or wireless communications network. The computer may be in communication with the impact sensor 102 and the inflator via the communications network 100.

Figure 7:
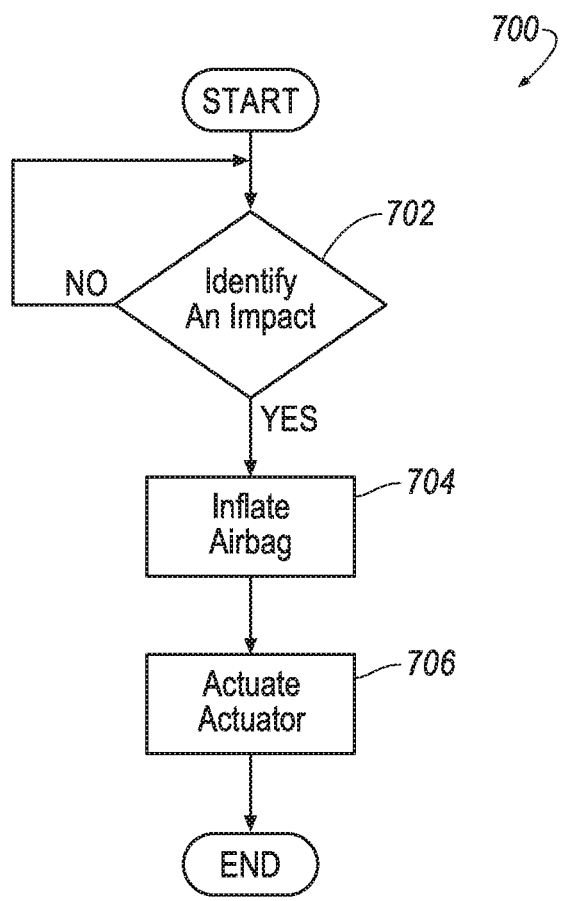
FIG. 7 is a block diagram showing a method performed by a computer of the vehicle.

The computer may be a microprocessor-based controller. The computer may include a processor, memory, etc. The memory of the computer may store instructions executable by the processor as well as data and/or databases. The computer is programmed to perform the method shown in FIG. 7, i.e., the memory stores instructions executable by the processor to perform the elements of the method shown in FIG. 7.

The computer may be programmed to determine an impact to the vehicle, as shown in 702. For example, the computer may determine that a vehicle impact has occurred based on information received from the impact sensor 102 via the communications network 100.

The computer is programmed to initiate inflation of the airbag 24, as shown in 704, and to actuate the actuator 64, as shown in 706, after initiation of inflation of the airbag 24. Accordingly, the activation of the actuator 64 pulls the airbag 24 toward the occupant seating area 50 to pull the occupant toward the occupant seating area 50.

Computing devices, such as the computer, generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

A computer-readable medium (also referred to as a processor-readable medium) includes any non-transitory (e.g., tangible) medium that participates in providing data (e.g., instructions) that may be read by the computer 106 (e.g., by a processor of the computer 106). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an engine control unit (ECU). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which the computer 106 can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   a seatback and a seat bottom, the seat bottom having a seat bottom frame;
   the seat bottom frame having a front side spaced from the seatback, a first side extending between the seatback and the front side, and a second side spaced from the first side and extending between the seatback and the front side;
   an airbag supported by the front side and inflatable to an inflated position;
   an external tether extending from the airbag to the seatback; and
   the airbag includes an inflatable portion and a non-inflatable portion, the inflatable portion supporting the non-inflatable portion.

2. The assembly of claim 1, wherein the inflatable portion is elongated from a first end to a second end, the first end and the second end being spaced from each other and connected to the seat bottom, the inflatable portion being spaced from the seat bottom between the first end and the second end in the inflated position.

3. The assembly of claim 2, wherein the non-inflatable portion is connected to the inflatable portion between the first end and the second end.

4. The assembly of claim 2, wherein the non-inflatable portion is connected to the inflatable portion at a first location adjacent the first end and at a second location adjacent the second end.

5. The assembly of claim 4, wherein the non-inflatable portion is connected to the inflatable portion between the first location and the second location.

6. The assembly of claim 2, wherein the inflatable portion is tubular from the first end to the second end.

7. The assembly of claim 2, wherein the inflatable portion turns generally 180 degrees from the first end to the second end.

8. The assembly of claim 2, wherein the inflatable portion has a first leg at the first end, a second leg at the second end, and a cross-member spaced from the seat bottom and extending from the first leg to the second leg, the non-inflatable portion being connected to the first leg, the second leg, and the cross-member.

9. The assembly of claim 1, wherein the external tether is embedded in the seatback and the seat bottom before the airbag is inflated to the inflated position.

10. The assembly of claim 1, wherein the external tether is connected to an upper portion of the seatback.

11. The assembly of claim 10, wherein the airbag has a distal end distal to the seat bottom in the inflated position and the external tether is connected to the distal end.

12. The assembly of claim 1, wherein the airbag has a distal end distal to the seat bottom in the inflated position and the external tether is connected to the distal end.

13. The assembly of claim 1, wherein the seatback includes an actuator, the external tether being connected to the actuator and retractable by the actuator.

14. The assembly of claim 1, wherein the external tether is directly connected to the seatback and directly connected to the airbag.

15. The assembly of claim 1, wherein the external tether is fixed relative to the airbag and the seatback.

16. The assembly of claim 1, wherein the non-inflatable portion is connected to the inflatable portion and the seat bottom.

17. An assembly comprising:
   a seatback and a seat bottom, the seat bottom having a seat bottom frame;
   the seat bottom frame having a front side spaced from the seatback, a first side extending between the seatback and the front side, and a second side spaced from the first side and extending between the seatback and the front side;
   an airbag supported by the front side and inflatable to an inflated position;

an external tether extending from the airbag to the seatback; and a second external tether spaced from the external tether and extending from the airbag to the seatback.

18. The assembly of claim 17, wherein the seatback has a first bolster, a second bolster, and an occupant seating area between the first bolster and the second bolster, the external tether being connected to the first bolster and the second external tether being connected to the second bolster.

19. The assembly of claim 18, wherein the airbag has a distal end distal to the seat bottom in the inflated position, the external tether and the second external tether being connected to the distal end.

20. The assembly of claim 18, wherein the external tether is embedded in the first bolster and the seat bottom before the airbag is inflated to the inflated position and the second external tether is embedded in the second bolster and the seat bottom before the airbag is inflated to the inflated position.

* * * * *